United States Patent
Marian et al.

(10) Patent No.: US 6,982,977 B2
(45) Date of Patent: Jan. 3, 2006

(54) LABEL SWITCHED ROUTING SYSTEM AND METHOD

(75) Inventors: Constantin Viorel Marian, Nepean (CA); Dan Oprea, Kanata (CA)

(73) Assignee: Tropic Networks Inc., Kanata (CA)

( * ) Notice: Subject to any disclaimer, the term of this patent is extended or adjusted under 35 U.S.C. 154(b) by 883 days.

(21) Appl. No.: 09/981,887

(22) Filed: Oct. 19, 2001

(65) Prior Publication Data

US 2003/0081589 A1    May 1, 2003

(51) Int. Cl.
*H04L 12/56*    (2006.01)
*H04L 12/28*    (2006.01)

(52) U.S. Cl. .................. 370/392; 370/400; 370/428
(58) Field of Classification Search ............. 370/466, 370/467, 471, 473, 474, 386, 388, 389, 392, 370/399, 395.3, 395.31, 398, 400, 401, 405, 370/406, 409, 469, 216, 254, 428
See application file for complete search history.

(56) References Cited

U.S. PATENT DOCUMENTS

2002/0172155 A1 *  11/2002  Kasvand-Harris et al. .. 370/229
2003/0043792 A1 *   3/2003  Carpini et al. ............. 370/386
2004/0057424 A1 *   3/2004  Kokkonen .................. 370/352

* cited by examiner

*Primary Examiner*—Alpus H. Hsu
*Assistant Examiner*—Lina Yang
(74) *Attorney, Agent, or Firm*—Victoria Donnelly

(57) ABSTRACT

A packet routing/switching system and method are provided by which label switched routing is performed within a hierarchy of LSP/FA-LSPs defined/provisioned in a network of interconnected nodes. Rather than transmitting an entire label stack with an LSP label for each LSP/FA-LSP in the hierarchy, at a given node in the network, a single LSP label is transmitted together with a components label which contains a list of component identifiers which do not inherently identify LSP/FA-LSPs, but from which the full LSP/FA-LSP labels can be determined locally at each node using previously distributed information described in detail below. The list of component identifiers is a shorthand way identifying to adjacent nodes the identity of the LSP/FA-LSP hierarchy without transmitting the entire LSP labels and thus significantly reducing overhead. The single label which is transmitted is the label of the LSP/FA-LSP of which the given node forms a part.

21 Claims, 7 Drawing Sheets

| LABEL 60 | RESTORATION 62 | 1ST COMP 64 | ... | N<sup>TH</sup> COMP 70 | USER PACKET 66 |

FIG. 4

| A | 0 | PACKET |

FIG. 5A

| K | 0 | 1ST COMP | PACKET |

FIG. 5B

| X | 0 | 1ST COMP | 1ST COMP | PACKET |

FIG. 5C

| X | 0 | 1ST COMP | 1ST COMP | PACKET |

FIG. 5D

| K | 0 | 1ST COMP | PACKET |

FIG. 5E

| A | 0 | PACKET |

FIG. 5F

| LSP/FA-LSP ID | NORMAL | | | RESTORATION | | | 1ST COMP | 2ND COMP | 3RD COMP | 4TH COMP |
|---|---|---|---|---|---|---|---|---|---|---|
| | SOURCE NODE | TRANSIT NODE | DEST NODE | SOURCE NODE | TRANSIT NODE | DEST NODE | | | | |
| A | 31 | 33 35 36 37 38 | 40 | | | | | | | |
| B | 32 | 33 35 36 37 38 | 41 | | | | | | | |
| C | 44 | 33 35 36 37 38 39 | 46 | | | | | | | |
| D | 45 | 33 35 36 37 38 39 | 47 | | | | | | | |
| K | 33 | 33 35 36 37 | 38 | | | | A | B | | |
| L | 34 | 33 35 36 37 | 39 | | | | C | D | | |
| X | 35 | 36 | 37 | 35 | 42 43 | 37 | K | L | | |

FIG. 8

LABEL SWITCHED ROUTING SYSTEM AND METHOD

FIELD OF THE INVENTION

The invention relates to systems and methods for performing label switched routing.

BACKGROUND OF THE INVENTION

If there are multiple LSPs (label switched paths) that all originate on one LSR (label switched router) and all terminate on another LSR, then these LSPs can be merged (under control of the head-end LSR) into a single FA-LSP (forwarding adjacency-label switched path) using the concept of link bundling which is described in detail in draft-kompella-mpls-bundle (see for example www.ietf.org/internet-drafts/draft-kompella-mpls-bundle-05. txt).

For example, to improve scalability of MPLS-TE (multiple protocol label switching protocol-traffic engineering) it may be useful to aggregate TE LSPs. The aggregation is accomplished by:

an LSR creating a TE LSP;

the LSR forming a forwarding adjacency out of that LSP (advertising this LSP as a link into an internal routing protocol such as ISIS or OSPF);

allowing other LSRs to use forwarding adjacencies for their path computation; and nesting of LSPs originated by other LSRs into that LSP by using a label stack construct.

The details of this approach and the label stack constructs can be found in draft-ietf-mpls-lsp-hierarchy,—(see for example www.ietf.org/internet-drafts/draft-ietf-mpls-lsp-hierarchy-02. txt).

This approach will be described further by way of example with reference to FIG. 1. Shown is a network of hierarchically connected nodes including at a lowest level in a hierarchy four nodes 1, 2, 10, 11, at a higher level in the hierarchy four nodes 3, 4, 8, 9, and at a highest level in the hierarchy three nodes 5, 6, 7. Also shown are four end user terminal devices T1, T2, T3 and T4 connected to nodes 1, 10, 2, 11 respectively. For a terminal T1 connected to node 1 to communicate with a terminal T2 connected to node 10, use may be made of a first forwarding adjacency established between node 5 and 7, a second between nodes 3 and 8, and a third between nodes 1 and 10. The result is that a user packet to be forwarded from T1 to T2, say an IP (Internet Protocol) packet, will have the user packet header, a first label understood by nodes 1 and 10 representing the LSP between these nodes, a second label understood by nodes 3 and 8 representing the forwarding adjacency between these nodes, and a third label understood by nodes 5 and 7 representing the forwarding adjacency between those nodes. Thus, for each packet there is the original user header, an IP header in this example, plus three labels. For packets which are long, the overhead introduced by these three additional labels may not be significant. However, for short packets, the overhead can be a significant percentage of the overall packet size. In some networks, for example networks in which there is significant voice traffic, there is a high percentage of the overall packet flow which has short packet length. An example packet size distribution is shown in FIG. 2 obtained during a seven minute interval over a real network in March of 1998 (see www.caida.org/outreach/resources/learn/packetsizes) where it can be seen that a significant fraction of the packets have a length less than 100 bytes. It is noted that in today's applications the number of small packets would be even larger than that shown in FIG. 2 because the number the voice-over-IP and IP teleconference applications has increased. Using the above described hierarchical labeling approach in a network with this type of packet length distribution would result in a significant increase in overall overhead.

SUMMARY OF THE INVENTION

A broad aspect of the invention provides a packet routing/switching method. The method involves defining a hierarchical plurality of label switched paths/forwarding adjacency-label switched paths (LSP/FA-LSP) through a network of nodes from a lowest (least-nested) level to a highest (most-nested) level, each LSP/FA-LSP comprising a respective sequence of nodes comprising at least a source node, a destination node, and possibly one or more transit nodes. To route a packet flow from a first source node of the network of nodes to a first destination node of the network of nodes the following steps are performed:

a) maintaining at the first node a mapping between the packet flow and a first LSP of the hierarchical plurality of LSPs defined between the first source node and the first destination node;

b) at the first source node, for each packet of said packet flow, adding to the packet label switched routing information comprising an LSP label identifying the first LSP and sending the packet to subsequent node(s) in the sequence of nodes defined for the first LSP;

c) at each node to which the packet is routed/switched other than said first source node;

i) if the node is a source node of a higher level FA-LSP than the LSP/FA-LSP identified by the LSP label of the packet, changing the LSP label in the label switched routing information to indicate the source node of the higher level FA-LSP, and including in the label switched routing information hierarchy information in respect of all lower level LSPs/FA-LSPs in the hierarchy leading up to the higher level FA-LSP and forwarding the packet to the next node in the sequence of nodes defined for the higher level FA-LSP;

ii) if the node is only a transit node, forwarding the packet to the next node in the sequence of nodes defined for the LSP/FA-LSP identified by the LSP label;

iii) if the node is a destination node of a higher level FA-LSP, changing the LSP label in the label switched routing information to indicate the source node of the next lower level LSP/FA-LSP indicated by the hierarchy information, and changing the hierarchy information to include only hierarchy information in respect of LSPs/FA-LSPs in the hierarchy leading up to but not including the next lower level LSP/FA-LSP, and forwarding the packet to the next node in the sequence of nodes defined for the next lower level LSP/FA-LSP.

Advantageously, the hierarchy information included in the packets takes significantly less space than the space required to include a full LSP label for each level in the hierarchy.

Preferably, for at least one of the LSPs/FA-LSPs in the hierarchical plurality of LSPs/FA-LSPs, an associated restoration path is defined between the source node and the destination node. Then, in each packet being routed/switched according to one of those LSPs/FA-LSPs an indication is included of whether the packet should be routed/switched on the restoration path associated with the LSP/

FA-LSP or not. Advantageously this allows for quick switching between normal and restoration paths by simply changing the indication.

Preferably, to allow routing/switching based on the information added to the packets in the above manner, each node maintains information in association with every defined LSP/FA-LSP. The information for each defined LSP/FA-LSP has an LSP label used to uniquely identify the LSP/FA-LSP throughout the network, an identification of the respective sequence of nodes, and an identification of the LSP/FA-LSP label for each possible next lowest level LSP/FA-LSP inside which the defined LSP/FA-LSP may be nested.

Furthermore, for each packet, the hierarchy information preferably includes a component identifier associated with each level in the hierarchy below the level of the LSP label of the packet. The component associated with one level below the level of the LSP label of the packet, when present, allows an identification of a particular possible next lowest level LSP/FA-LSP inside which the LSP/FA-LSP defined by the LSP label is to be used in routing the packet. The components associated with subsequent lower levels allow an identification of a particular nested hierarchy of LSPs/FA-LSPs to be used for the packet.

In the event restoration paths are being provided, the information maintained in association with defined LSPs/FA-LSPs further defines source node, transit node, destination node identifiers for the restoration path when present.

Preferably, the hierarchy information includes a bit position for each possible component at each level in the hierarchy, with a particular bit position being set (or cleared) to indicate a selected component as the particular possible component. More generally, a multi-bit component identifier may be employed for each level. The component identifier must contain enough bits to uniquely distinguish between possible components.

According to another broad aspect, the invention provides a method to be executed at a node within a network of interconnected nodes within which a hierarchical plurality of LSPs/FA-LSPs has been defined of performing label switching of packets having an LSP label and having a possibly empty components label. The method involves the node maintaining, in a table for example, for each LSP/FA-LSP an identification of a source node, transit nodes if any, and a destination node, and for each LSP/FA-LSP an identification of all possible next lowest level LSPs/FA-LSPs which may use the LSP/FA-LSP. For each packet received the node obtains the LSP label, the LSP label defining a current LSP/FA-LSP. The node obtains the components label. The node looks the information for the LSP label. In the event the node is a source node of a next higher level FA-LSP of which the current LSP/FA-LSP forms a component, the node switches the LSP label to contain the label of the next higher level FA-LSP which is used by the current LSP/FA-LSP, and changes the components label to include in a first component identifier an identifier of the current LSP/FA-LSP. In the event the node is the destination node of the current LSP/FA-LSP, the node changes the LSP label to the LSP/FA-LSP label for the lower level hierarchy determined from the components label and the table. The node re-applies the components label, re-applies the LSP label, and changes an output interface such that the packet is forwarded to an appropriate next node.

According to another broad aspect, the invention provides a method of performing label switched routing. The method involves, at each node in a network of nodes, for each packet removing a previous LSP header and adding a new header containing a full LSP label for a current LSP/FA-LSP, and containing components identifiers which allow local identification of a hierarchy of LSPs/FA-LSPs of which the current LSP/FA-LSP forms a part.

BRIEF DESCRIPTION OF THE DRAWINGS

Preferred embodiments of the invention will now be described with reference to the attached drawings in which:

FIG. 4 is an example cell format provided by an embodiment of the invention;

FIGS. 5A through 5F are cell formats used between adjacent nodes of FIG. 3 in an example implementation of the invention;

FIG. 8 is a table of information maintained for the LSP/FA-LSPs of FIG. 3.

DETAILED DESCRIPTION OF THE INVENTION

Figure 1:
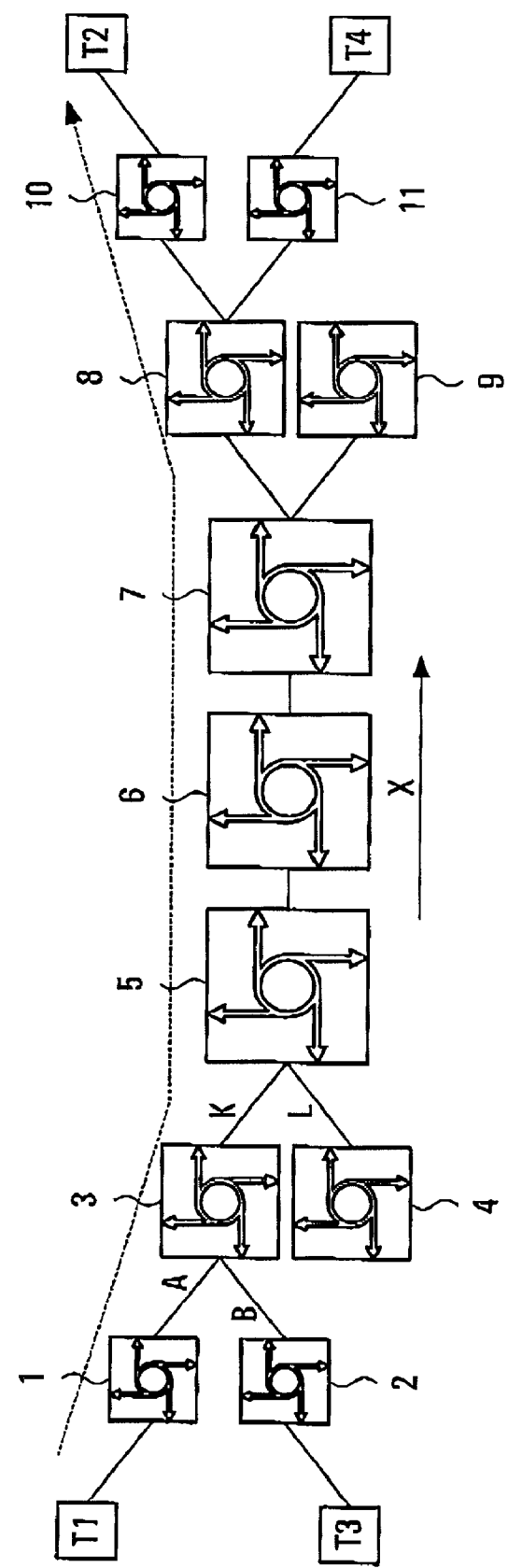
FIG. 1 is a block diagram of an example network in which label switched routing may employed.
Figure 2:
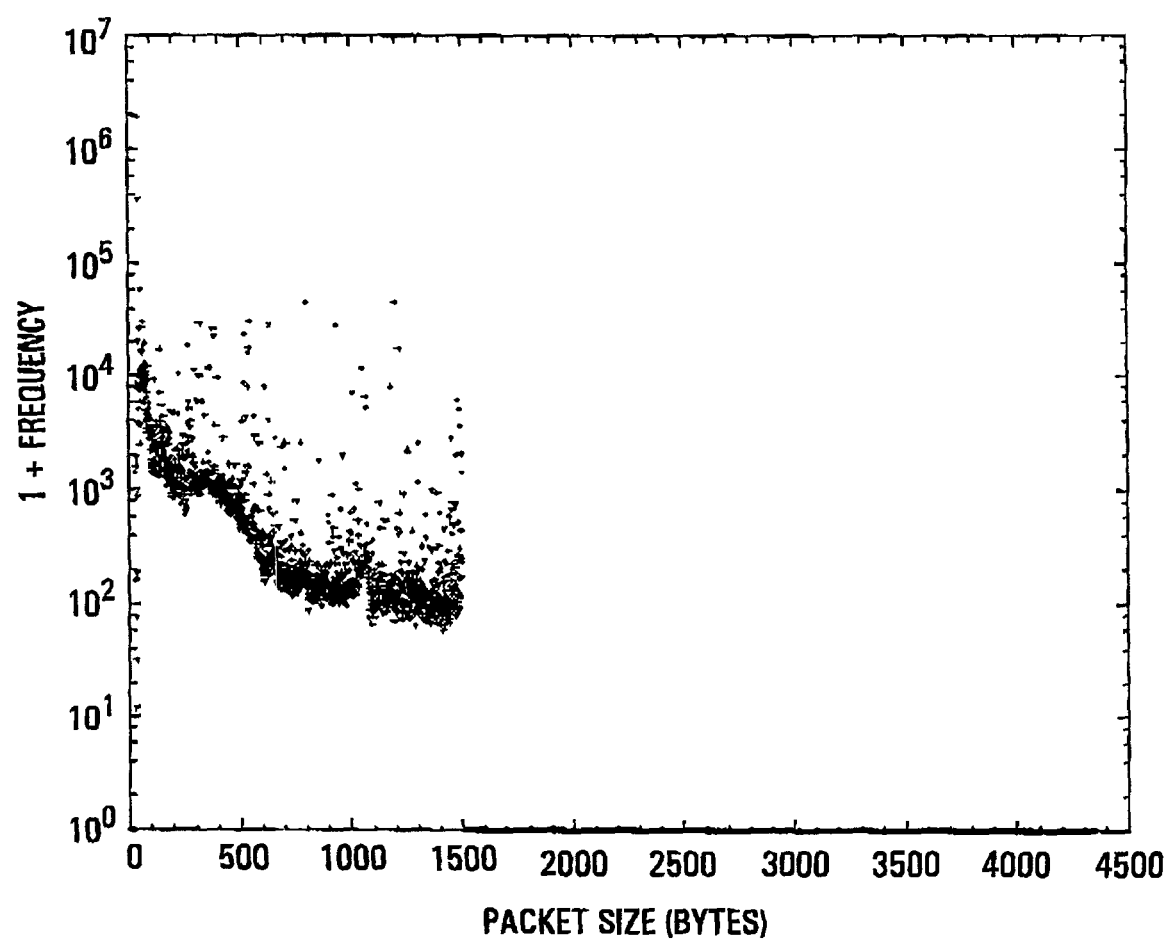
FIG. 2 is a plot of an example packet length distribution.

According to an embodiment of the invention, label switched routing is performed within a hierarchy of LSP/FA-LSPs defined/provisioned in a network of interconnected nodes. Rather than transmitting an entire label stack with an LSP label for each LSP/FA-LSP in the hierarchy, at a given node in the network, a single LSP label is transmitted together with a components label which contains a list of component identifiers which do not inherently identify LSP/FA-LSPs, but from which the full LSP/FA-LSP labels can be determined locally at each node using previously distributed information described in detail below. The list of component identifiers is a shorthand way identifying to adjacent nodes the identity of the LSP/FA-LSP hierarchy without transmitting the entire LSP labels and thus significantly reducing overhead. The single label which is transmitted is the label of the LSP/FA-LSP of which the given node forms a part.

The hierarchy of LSP/FA-LSPs will be considered to contain a plurality of levels. The lowest level will involve LSPs defined between edge nodes in the network. These lowest level LSPs may employ other FA-LSPs in a nested manner, with each level of nesting representing a higher level in the hierarchy. LSPs are provisioned at the lowest level in the hierarchy. An FA-LSP is a bundle of at least two LSPs.

For a bundle at level k+1 in a hierarchy of levels, the single label will identify the LSP/FA-LSP at level k+1, and the list components will specify the components at levels 1 through k. These components will be unique in the network. For a bundle at level 1 in the hierarchy of levels, this being the lowest level, k+1=1, so k=0. The single label will identify the LSP/FA-LSP at level k+1=1, and there will be no components since there are no additional components at this level. For a bundle at level 2 in the hierarchy, the single label will identify the LSP/FA-LSP at level 2, and there will be a single component identifier for level 1 which will allow the identification of the level 1 LSP/FA-LSP label at nodes within the network, and so on.

The information about each LSP/FA-LSP provisioned within the network is made known at each node including the relationship between the components and actual LSP/FA-LSPs which may for example be maintained in a table on each node. Such a table can be built using any suitable means. For example the table can be built "In band" meaning the data network (DN) used to transport the user data will also transport the information needed to build the table. The table could also be built "Out of band" meaning the information needed to build the table is transported over a control network (CN) that is different from data network.

Having established this information at each node, a cell format is used between nodes which will include the LSP label of the current LSP/FA-LSP, and a component for each lower level in the hierarchy. In a preferred embodiment, the possible components are maintained in a list in association with each LSP/FA-LSP, and the LSP identifier is simply used to identify the position in the list. For example, if there are four possible components for a given LSP/FA-LSP, then these four components are identified in the table in association with the LSP/FA-LSP. Then, the component identifier is used to identify a position in the list of four components, and thereby identify one of four LSP/FA-LSPs. This might for example involve allocating a single bit in the components label for each possible component, and then setting one of four bits high (or low) to indicate a selected component. In this manner, one of four pre-determined LSP labels can be indicated with only four bits in the header, this being significantly less than the size of an entire LSP label.

Figure 3:
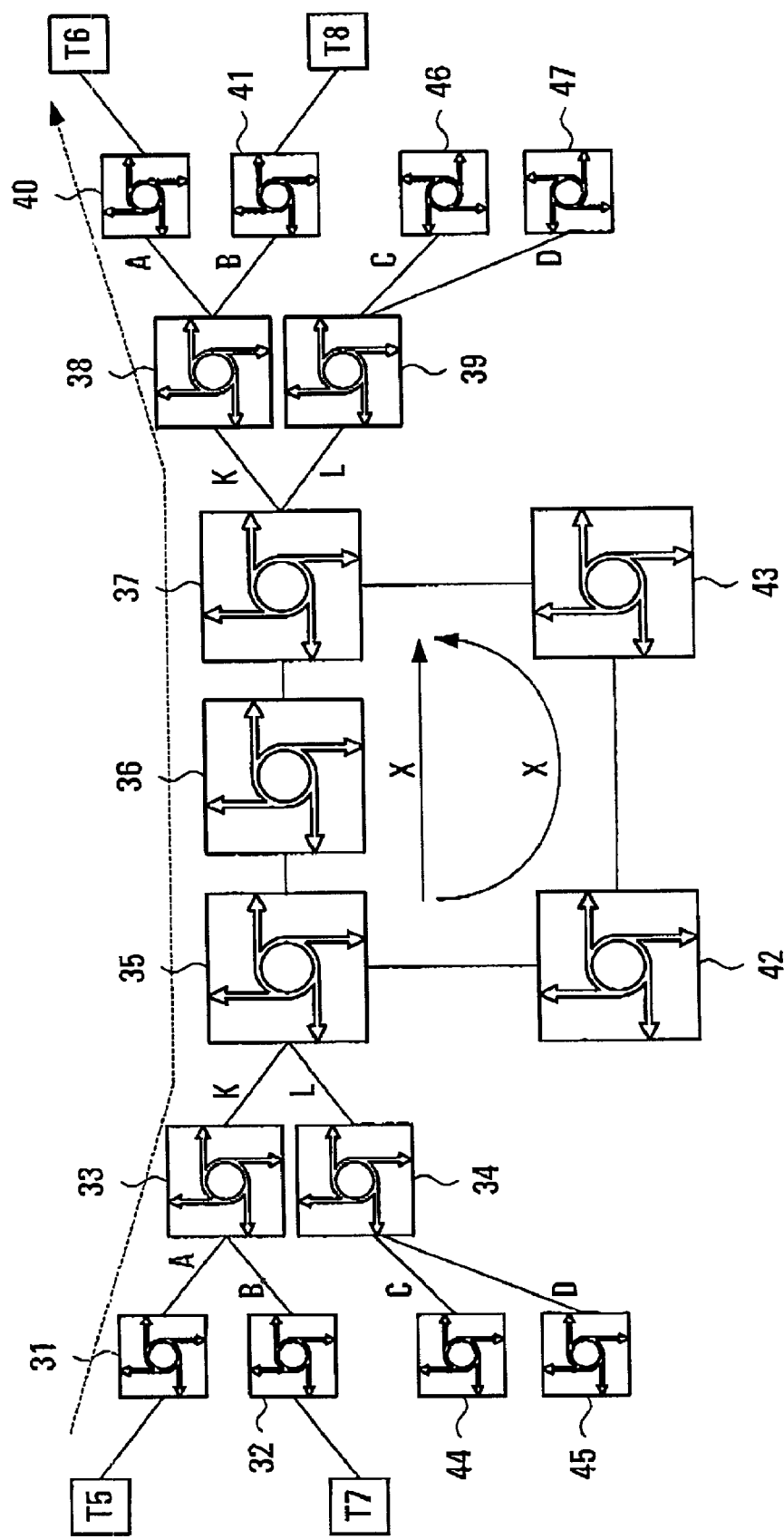
FIG. 3 is a block diagram of an example network in which an embodiment of the invention may be employed.

This embodiment of the invention will now be described in further detail with reference to the example of FIG. 3 which is a network containing 13 interconnected nodes 31, 32, 33, 34, 35, 36, 37, 38, 39, 40, 41, 42, 43, 44, 45, 46, 47. It is assumed that at the lowest in the hierarchy, there is an LSP A provisioned between nodes 31 and 40 and an LSP B between nodes 32 and 41. At the next level in the hierarchy, there is an FA-LSP K provisioned between nodes 33 and 38, and an FA-LSP L provisioned between nodes 34 and 39. An FA-LSP C is provisioned between nodes 44 and 46, and an FA-LSP D is provisioned between nodes 45 and 47. At the next level in the hierarchy (the highest level in this example), there is an FA-LSP X provisioned between nodes 35 and 37 which passes through node 36, and fox which there is a provisioned a restoration path which passes through nodes 42 and 43.

For this example, it is assumed that there are two user packet streams entering nodes 31, 32 respectively from end user terminals T5, T7 and exiting nodes 40, 41 to end user terminals T6, T8 respectively. These may contain any appropriate type of user packet, for example IP packets.

In the nodes at the edge of the network (like 31, 32, 40, 41 there is maintained a table (or other suitable structure) that defines a correspondence between the destination and the LSP label for the lowest level in the hierarchy. Thus, in our example, for the user packet stream entering node 31 from end user device T4, node 31 maintains a correspondence between the destination for device T6 and the LSP label representing the path between nodes 31 and 40, namely LSP A. Similarly, for the user packet stream entering node 32 from end user device T7, node 32 maintains a correspondence between the destination for device T8 and the LSP label representing the path between nodes 32 and 40, namely B. More generally, some association with packet streams and LSPs needs to be maintained.

In the nodes internal to the edge, a table (or other suitable structure) is provided with information concerning each LSP and FP-LSP. The information might for example take the format of the table shown in FIG. 8, where data has been filled in for the example network of FIG. 3. FIG. 8 contains a record for each LSP/FA-LSP and for the illustrated example this results in a record for each of LSP/FA-LSPs A, B, C, D, K, L and X. In the above example, the first column contains the full LSP/FA-LSP label this typically takes 32 bits. The second column contains the source node for the LSP/FA-LSP. The third column contains the transit nodes for the LSP/FA-LSP and the fourth column contains the destination node for the LSP/FA-LSP. Node identifiers could be in any suitable format for example integer, IP addresses or even a character string. For LSP A in our example, there is source node 31, transit nodes 33, 35, 36, 37, 38 and destination node 40.

In a preferred embodiment, additional information is provided which allows an identification of restoration paths for one or more LSP/FA-LSPs. For example, in FIG. 8, the fifth, sixth and seventh identify source, transit and destination nodes for a restoration (backup) path should one have been provisioned for the particular LSP/FA-LSP. For FA-LSP X in our example, there is a provisioned backup path which has source node 35, transit nodes 42, 43 and destination node 37. In the eighth through $11^{th}$ columns, there are places for "components". A component for this purpose is an LSP label of an LSP/FA-LSP which is at the lower level in the LSP/FA-LSP hierarchy than that of the current record under consideration, and which may make use of the LSP/FA-LSP of the record under consideration. For LSP A, this is not made use of by a lower level LSP/FA-LSP and as such has no components listed. For FA-LSP K, this may be used in LSP A, or in LSP B, and as such there is space for the identity of these two components. Similarly, for FA-LSP L, there are first and second components C and D, and for FA-LSP X, there are first and second components K and L.

This table can be also used to get the source for a flow to which an error message (icmp for IP) is to be sent. This table can be used in conjunction with an instance of a control network (CN) with out of band signalization.

Referring to FIG. 4, an example cell format will be described. The cell format has a current label field 60 which is the basis of the current routing/switching process. For embodiments allowing the specification of restoration paths, there is a field 62 for indicating whether or not the restoration path or the normal path is being used for routing. Then, there is a list 64, 70 of component identifiers, one for each level in the hierarchy below the level of the current label. It is to be understood the order of those fields is not essential. There is a one-to-one correspondence between the component identifiers and the components in the table described above. In one embodiment, there may be a one bit placeholder in the components label for each component identifier which is set to indicate that component. More generally, a multi-bit component identifier can be employed for each level. The component identifier must contain enough bits to uniquely distinguish between all possible components.

Figure 7:
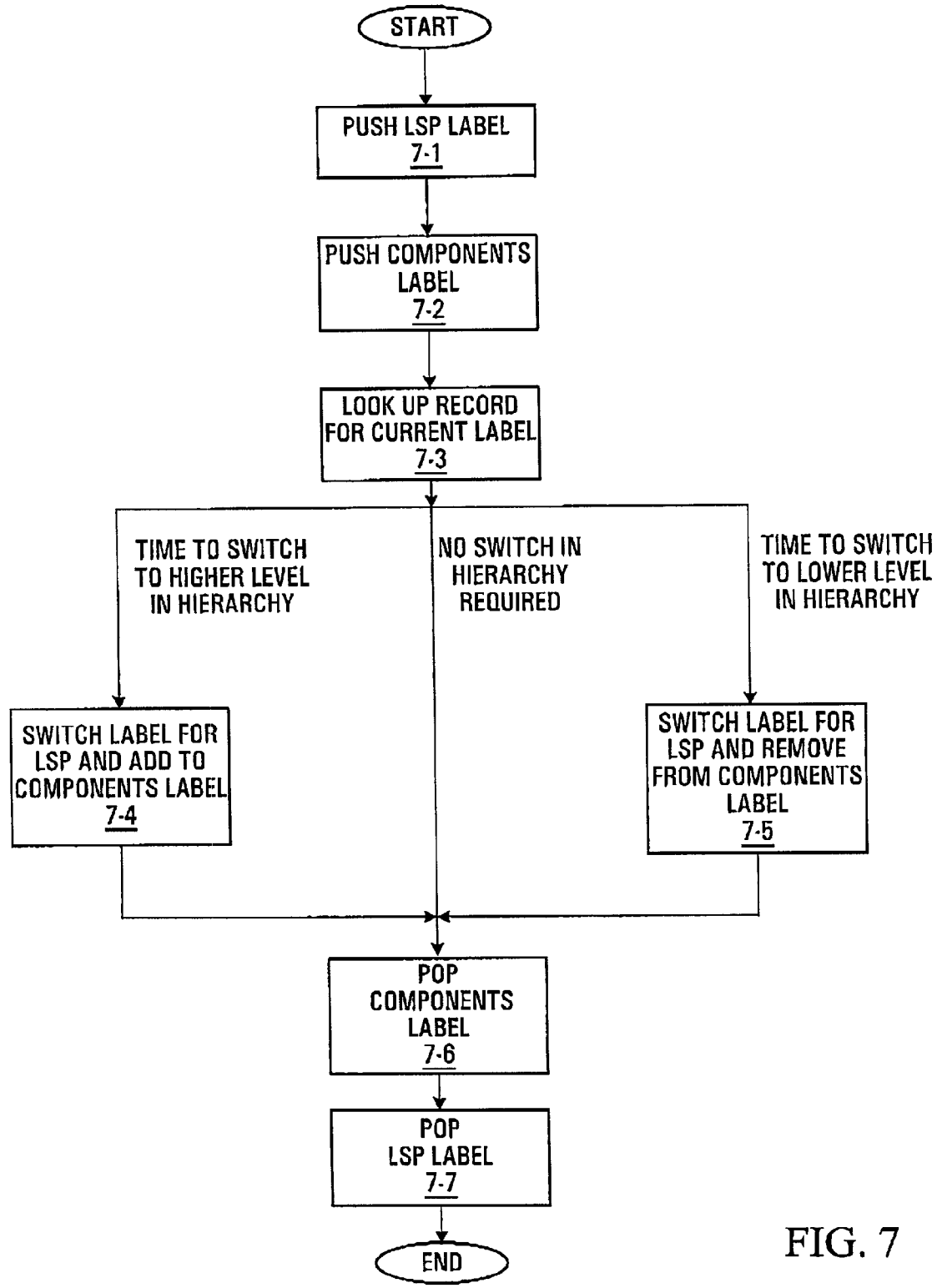
FIG. 7 is a flowchart of an example method of processing cells by each node in a network.

The actions performed at each node in routing/switching packets will now be described in detail with reference to the flowchart of FIG. 7.

Step 7-1; the node obtains (for example pushes) the LSP label (in current label field);

Step 7-2: the node obtains (for example pushes) the components label (hierarchy);

Step 7-3: the node looks up the record in the table for the LSP label;

Next, before step 7-6, one of steps 7-4, 7-5 may be executed. Step 7-4 is executed in the event that it is time to label switch to a higher level in the hierarchy. Neither of steps 7-4 or 7-5 is executed in the event there is no need to perform a label switch to a different level in the hierarchy. Step 7-5 is executed in the event that it is time to label switch to a lower level in the hierarchy.

Step 7-4: In the event the current node is the source node of an LSP/FA-LSP of which the current LSP/FA-LSP forms a component, then it is time to do a label switch. The LSP label is switched to contain the label of the next higher level LSP/FA-LSP which is used by the current LSP/FA-LSP. The components label is changed to include in the first component identifier an identifier of the current LSP/FA-LSP.

In the event the current node is a transit node associated with the LSP label, then there is no need to change the first label or the hierarchy and thus neither of steps 7-4 or 7-5 is required.

Step 7-5: In the event the current node is the destination node of the current LSP/FA-LSP, the LSP label (hierarchy) is changed to the LSP label for the lower level in the hierarchy as determined from the components label and the table. The components label is also changed so as to no longer include a components identifier in respect of the lower level.

Step 7-6: The node re-applies (for example pops) the components label.

Step 7-7. The node re-apples (for example pops) the LSP label.

In all cases, the output interface would be changed such that the packet is forwarded to the appropriate next node.

Now, the format of cells for our example scenario will be described, first for the case where the normal path between nodes 35 and 37 is used, and second for the case where the protection path between nodes 35 and 37 is used.

Referring now to FIG. 5A, shown is the cell format used between nodes 31 and 33. The cell includes the user packet and which includes the packet, a "0" bit indicating that the primary path is being used, and in a first label field, the LSP label A, which is the label for the highest LSP/FA-LSP hierarchy path.

Referring now to FIG. 5B, shown is the cell format used between nodes 33 and 35. Once again, the cell includes the user packet. Shown in the first label field is LSP label K which is the LSP label for the FA-LSP defined between nodes 33 and 38 which is being used for the current transmission. The "0" indicates that the primary path is being used. Finally, the components label has a single entry for indicating the component identifier of the lowest level in the hierarchy, in this case LSP A. By indicating "$1^{st}$ component", this means that the label for A can be recovered by looking at the first component identified in the table for the current LSP/FA-LSP, namely FA-LSP K. In the event the connection was that originating at end user terminal T7 through node 32, then the lowest level LSP/FA-LSP would be LSP B the component identifier would indicate "$2^{nd}$ component" from which the label for B can be recovered by looking at the second component identified in the table for the current LSP/FA-LSP, namely FA-LSP K.

Referring now to FIG. 5C, shown is the cell format for use between nodes 35 and 36. Once again, the cell includes the user packet being transmitted. The LSP label field is filled with "X" which is the FA-LSP from nodes 35 to 37 used for transmission between nodes 35 and 36. The "0" again indicates that the primary path is being used. Next, there are two entries for indicating the LSP/FA-LSP of the two lower levels in the hierarchy. The first entry indicates the component for the next lowest level in the hierarchy used for the path, namely component K. K is the first component of FA-LSP X, and as such the entry is used to indicate the first component. Similarly, the second entry indicates the component for the lowest level in the hierarchy, namely component A which was the first component of component K. In any case, the component identifiers of lower levels in the hierarchy will carry over from lower levels.

FIG. 5D shows the format used between nodes 36 and 37. This format is identical to that used between cells 35 and 36 because transmission is still within nodes belonging only to FA-LSP X and at the same level of hierarchy. The output interface would be changed however.

FIG. 5E shows the cell format used between nodes 37 and 38. This cell format is the same as that used between nodes 33 and 35.

FIG. 5F shows the cell format used between nodes 38 and 14. This cell format is the same as that used between nodes 31 and 33.

Figure 6A:
FIGS. 6A through 6G are cell formats used between adjacent nodes of FIG. 3 in an example implementation of the invention in which the restoration path is being employed.
Figure 6B:

Now, in the event the restoration path for FA-LSP X is activated, then the cell format is slightly changed for some of the transmissions. The cell format between nodes 31 and 33 and between nodes 33 and 35 is unchanged from that introduced for the normal example and is shown in FIGS. 6A, 6B respectively.

Figure 6C:
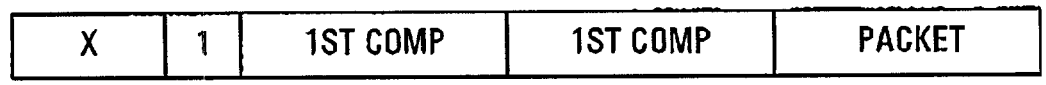

There is then a cell format between nodes 35 and 42 which is indicated in FIG. 6C. In this case, the LSP label is "X" which is the FA-LSP defined between nodes 35 and 37. However, in this case, the restoration field is set to "1" indicating that the restoration path is being used, namely the restoration path 35, 42, 43, 37 defined in the table for FA-LSP X. The two component identifiers are as before, filled in to point to LSP/FA-LSPs K and A by containing "first component", "first component".

Figure 6D:

FIG. 6D shows the cell format used between nodes 42 and 43 for the restoration path example. The cell format is the same as that used between nodes 35 and 42. The output interface would be changed such that cells are forwarded to node 43.

Figure 6E:

FIG. 6E shows the cell format used between nodes 43 and 37 for the restoration path example. The cell format is the same as that used between nodes 35 and 42 although the output interface would be changed such that cells are forwarded to node 43.

Figure 6F:

FIG. 6F shows the cell format used between nodes 37 and 38, for the restoration path example, this being identical to the cell format used for normal example. The fact that the restoration path was used for the higher level in the hierarchy is hidden in this view, and no longer relevant.

Figure 6G:

Finally, FIG. 6G shows the cell format used between nodes 38 and 40 for the restoration path example, this being identical to the cell format used for the normal example.

COMPARISON

A comparison between the overhead introduced using traditional label stacking, and the overhead introduced using the techniques provided by the above described embodiment of the invention will now be made. In an IP network if it is assumed that the traffic will be received via Ethernet accesses, then packets will vary in length between 0 and 1500 bytes. These packets are not uniformly distributed in size, and are likely to have a trimodal distribution (much more small packets than large packets, with 3 important peaks).

In this comparison it is assumed that there are five levels of hierarchy. In this example it is assumed that the necessary hierarchy information (pointers or components identifiers) could be transported in one single label. The following table summarizes the percentage occupied by the header when a regular label stack is employed (that described in the Background of the Invention), and the label approach provided by an embodiment of the invention for packet lengths from 40 to 1500 bytes. It can be seen that for short packets (40 bytes in length), the header percentage is reduced from 33.3% to 16.7% which is a very significant decrease in systems with high short packet frequency.

| Packet length in bytes | 40 | 100 | 480 | 1000 | 1500 |
|---|---|---|---|---|---|
| Packet length with regular label stack | 60 | 120 | 500 | 1020 | 1520 |
| Packet length with components id | 48 | 108 | 488 | 1008 | 1508 |
| Header with regular label stack (%) | 33.3 | 16.7 | 4 | 2 | 1.3 |
| Header with one label (%) | 16.7 | 7.4 | 1.6 | 0.8 | 0.5 |

It can be seen that the most benefit from the method will be realized for traffic which contains a high percentage of small packets, for example voice traffic.

Numerous modifications and variations of the present invention are possible in light of the above teachings. It is therefore to be understood that within the scope of the appended claims, the invention may be practised otherwise than as specifically described herein.

We claim:

1. A packet routing/switching method comprising:
   defining a hierarchical plurality of label switched paths (LSP)/forwarding adjacency-label switched paths (FA-LSP) through a network of nodes from a lowest (least-nested) level to a highest (most-nested) level, each LSP/FA-LSP comprising a respective sequence of nodes comprising at least a source node and a destination node and possibly one or more transit nodes;
   to route/switch a packet flow from a first source node of said network of nodes to a first destination node of said network of nodes:
   a) maintaining at the first node a mapping between the packet flow and a first LSP of the hierarchical plurality of LSP/FA-LSPs defined between the first source node and the first destination node;
   b) at the first source node, for each packet of said packet flow, adding to the packet label switched routing information comprising an LSP label identifying the first LSP and sending the packet to subsequent node(s) in the sequence of nodes defined for the first LSP;
   c) at each node to which the packet is routed/switched other than said first source node:
      i) if the node is a source node of a higher level FA-LSP than the LSP/FA-LSP identified by the LSP label of the packet, changing the LSP label in the label switched routing information to indicate the source node of the higher level FA-LSP, and including in the label switched routing information hierarchy information in respect of all lower level LSP/FALSPs in the hierarchy leading up to the higher level FA-LSP and forwarding the packet to the next node in the sequence of nodes defined for the higher level FA-LSP;
      ii) if the node is only a transit node, forwarding the packet to the next node in the sequence of nodes defined for the LSP/FALSP identified by the LSP label;
      iii) if the node is a destination node of a higher level FA-LSP, changing the LSP label in the label switched routing information to indicate the source node of the next lower level LSP/FA-LSP indicated by the hierarchy information, and changing the hierarchy information to include only hierarchy information in respect of LSP/FA-LSPs in the hierarchy leading up to but not including the next lower level LSP/FA-LSP, and forwarding the packet to the next node in the sequence of nodes defined for the next lower level LSP/FA-LSP.

2. A method according to claim 1 further comprising:
   for at least one of the LSP/FA-LSPs in the hierarchical plurality of LSP/FA-LSPs, defining an associated restoration path between the source node and the destination node of each said at least one of the LSP/FA-LSPs;
   including in each packet being routed according to one of said at least one LSP/FA-LSPs an indication of whether the packet should be routed on the restoration path associated with the LSP/FA-LSP or not.

3. A method according to claim 2 wherein the information maintained in association with every defined LSP/FA-LSP further comprises in the event there is a restoration path for the defined LSP/FA-LSP, source node, transit node, destination node identifiers for the restoration path.

4. A method according to claim 2 wherein network information in association with every defined LSP/FA-LSP, node, and updates are distributed using an in band or out of band mechanism.

5. A method according to claim 1 further comprising maintaining in each node in the network information in association with every defined LSP/FA-LSP, the information comprising for each defined LSP/FA-LSP:
   an LSP label used to uniquely identify the LSP/FA-LSP throughout the network;
   an identification of the respective sequence of nodes;
   an identification of the LSP label for each possible next lowest level LSP/FA-LSP inside which the defined LSP/FA-LSP may be used.

6. A method according to claim 5 wherein:
   for each packet, the hierarchy information includes a component identifier associated with each level in the hierarchy below the level of the LSP label of the packet;
   the component associated with one level below the level of the LSP label of the packet, when present, allowing an identification of a particular possible next lowest level LSP/FA-LSP inside which the LSP/FA-LSP defined by the LSP label is to be used in routing/switching the packet;
   the components associated with subsequent lower levels allowing an identification of a particular nested hierarchy of LSP/FA-LSPs to be used for the packet.

7. A method according to claim 6 wherein:
   the hierarchy information includes a bit position for each possible component at each level in the hierarchy, with a particular bit position being set (or cleared) to indicate a selected component as the particular possible component.

8. A method according to claim 8 wherein the hierarchy information includes a respective multi-bit component identifier field for each level in the hierarchy, each component identifier field being large enough to uniquely distinguish between possible components of the respective level in the hierarchy.

9. A method according to claim 1 adapted to route IP packets.

10. A method to be executed at a node within a network of interconnected nodes within which a hierarchical plurality of LSP/FA-LSPs has been defined of performing label switching of packets having an LSP label and having a possibly empty components label, the method comprising:
the node maintaining information for each LSP/FA-LSP comprising an LSP label, an identification of a source node, transit nodes if any, and a destination node, and for each LSP/FA-LSP an identification of all possible next lowest level LSP/FA-LSPs which may use the LSP/FA-LSP;
the node obtaining the LSP label, the LSP label defining a current LSP/FA-LSP of a packet to be routed;
the node obtaining the components label of the packet;
the node looking up the information for the current LSP/FA-LSP;
in the event the node is a source node of a next higher level FA-LSP of which the current LSP/FA-LSP forms a component, switching the LSP label to contain the label of the next higher level FA-LSP which is used by the current LSP/FA-LSP, and adding to the components label to include in an additional component identifier an identifier of the current LSP/FA-LSP;
in the event the node is the destination node of the current LSP/FA-LSP, determining from the components label and the maintained information another LSP label for a lower level LSP/FA-LSP from a component identifier for the lower level and removing the component identifier for the lower level from the components label, and changing the LSP label to the another LSP label for the lower level hierarchy determined from the components label;
the node re-applying the components label to the packet;
the node re-applying the LSP label to the packet; and
the node changing an output interface such that the packet is forwarded to an appropriate next node.

11. A method of performing label switched routing in a network comprising a plurality of nodes, the method comprising:
at each node of the plurality of nodes in the network:
receiving a packet having a previous label switched path (LSP) header from a previous node in the network;
removing the previous LSP header from the packet and adding a new header to the packet containing a full LSP label for a current label switched paths/forwarding adjacency-label switched paths LSP/FA-LSP, and containing components identifiers which allow local identification of a hierarchy of LSP/FA-LSPs of which the current LSP/FA-LSP forms a part; and
forwarding the packet having the new header to a next node in the network.

12. A network of interconnected nodes wherein label switched routing is performed in accordance with the method described in claim 11.

13. A packet routing/switching system comprising:
a network of interconnected nodes through which is defined a hierarchical plurality of label switched paths (LSP)/forwarding adjacency-label switched paths (FA-LSP) from a lowest (least-nested) level in which LSPs are defined between edge nodes of the network to a highest (most-nested) level, each LSP/FA-LSP comprising a respective sequence of nodes comprising at least a source node and a destination node and possibly one or more transit nodes;
wherein each edge node is adapted to maintain a mapping between each packet flow entering the network at the edge node and a respective first LSP of the hierarchical plurality of LSP/FA-LSPs defined between the edge node and a destination node in the network for the packet flow;
wherein each edge node is further adapted to add to each packet of a given packet flow switched routing information comprising an LSP label identifying the respective first LSP to which the packet flow is mapped and to send the packet to subsequent node(s) in the sequence of nodes defined for the respective first LSP;
wherein each node other than an edge node is adapted to perform label switching by:
i) if the node is a source node of a higher level FA-LSP than the LSP/FA-LSP identified by the LSP label of the packet, changing the LSP label in the label switched routing information to indicate the source node of the higher level FA-LSP, and including in the label switched routing information hierarchy information in respect of all lower level LSP/FA-LSPs in the hierarchy leading up to the higher level FA-LSP and forwarding the packet to the next node in the sequence of nodes defined for the higher level FA-LSP;
ii) if the node is only a transit node, forwarding the packet to the next node in the sequence of nodes defined for the LSP/FA-LSP identified by the LSP label;
iii) if the node is a destination node of a higher level FA-LSP, changing the LSP label in the label switched routing information to indicate the source node of the next lower level LSP/FA-LSP indicated by the hierarchy information, and changing the hierarchy information to include only hierarchy information in respect of LSP/FA-LSPs in the hierarchy leading up to but not including the next lower level LSP/FA-LSP, and forwarding the packet to the next node in the sequence of nodes defined for the next lower level LSP/FA-LSP.

14. A system according to claim 13 wherein:
for at least one of the LSP/FA-LSPs in the hierarchical plurality of LSP/FA-LSPs, an associated restoration path is defined between the source node and the destination node of each said at least one of the LSP/FA-LSPs;
in each packet being routed according to one of said at least one LSP/FA-LSPs an indication is included of whether the packet should be routed on the restoration path associated with the LSP/FA-LSP or not.

15. A system according to claim 14 wherein the information maintained in association with every defined LSP/FA-LSP further comprises in the event there is a restoration path for the defined LSP/FA-LSP, source node, transit node, destination node identifiers for the restoration path.

16. A system according to claim 14 wherein the information in association with every defined LSP/FA-LSP and updates to the information are distributed using an in band or out of band mechanism.

17. A system according to claim 13 wherein each node in the network maintains information in association with every defined LSP/FA-LSP, the information comprising for each defined LSP/FA-LSP:

an LSP label used to uniquely identify the LSP/FA-LSP throughout the network;

an identification of the respective sequence of nodes;

an identification of the LSP label for each possible next lowest level LSP/FA-LSP inside which the defined LSP/FA-LSP may be used.

18. A system according to claim 17 wherein:

for each packet, the hierarchy information includes a component identifier associated with each level in the hierarchy below the level of the LSP label of the packet;

the component identifier associated with one level below the level of the LSP label of the packet, when present, allowing an identification of a particular possible next lowest level LSP/FA-LSP inside which the LSP/FA-LSP defined by the LSP label is to be used in routing/switching the packet;

the component identifier associated with subsequent lower levels allowing an identification of a particular nested hierarchy of LSP/FA-LSPs to be used for the packet.

19. A system according to claim 18 wherein:

the hierarchy information includes a bit position for each possible component at each level in the hierarchy, with a particular bit position being set (or cleared) to indicate a selected component as the particular possible component.

20. A system according to claim 18 wherein the hierarchy information includes a respective multi-bit component identifier field for each level in the hierarchy, each component identifier field being large enough to uniquely distinguish between possible components of the respective level in the hierarchy.

21. A network node within a network of interconnected nodes within which a hierarchical plurality of LSP/FA-LSPs has been defined, the network node comprising:

a network information repository comprising for each LSP/FA-LSP an LSP label, an identification of a source node, transit nodes if any, and a destination node, and for each LSP/FA-LSP an identification of all possible next lowest level LSP/FA-LSPs which may use the LSP/FA-LSP;

a packet router adapted to route each packet by:

obtaining an LSP label of the packet, the LSP label defining a current LSP/FA-LSP of the packet;

obtaining a components label of the packet;

looking up the information in the network information repository for the current LSP/FA-LSP;

in the event the node is a source node of a next higher level FA-LSP of which the current LSP/FA-LSP forms a component, switching the LSP label to contain the label of the next higher level FA-LSP which is used by the current LSP/FA-LSP, and adding to the components label to include in an additional component identifier an identifier of the current LSP/FA-LSP;

in the event the node is the destination node of the current LSP/FA-LSP, determining from the components label and the maintained information another LSP label for a lower level LSP/FA-LSP from a component identifier for the lower level and removing the component identifier for the lower level from the components label, and changing the LSP label to the another LSP label for the lower level hierarchy determined from the components label;

re-applying the components label to the packet;

re-applying the LSP label to the packet; and changing an output interface such that the packet is forwarded to an appropriate next node.

* * * * *

UNITED STATES PATENT AND TRADEMARK OFFICE
CERTIFICATE OF CORRECTION

| | |
|---|---|
| PATENT NO. | : 6,982,977 B2 |
| APPLICATION NO. | : 09/981887 |
| DATED | : January 3, 2006 |
| INVENTOR(S) | : C. V. Marian et al. |

It is certified that error appears in the above-identified patent and that said Letters Patent is hereby corrected as shown below:

Column 9, line 63, delete "FALSPs" and insert --FA-LSPs--.

Column 10, line 3, delete "FALSP" and insert --FA-LSP--.

Column 10, line 25, cancel the text beginning with "3. A method according" to and ending "restoration path." and insert the following claim:

--3. A method according to claim 1 further comprising maintaining in each node in the network information in association with every defined LSP/FA-LSP, the information comprising for each defined LSP/FA-LSP:
an LSP label used to uniquely identify the LSP/FA-LSP throughout the network;
an identification of the respective sequence of nodes;
an identification of the LSP label for each possible next lowest level LSP/FA-LSP inside which the defined LSP/FA-LSP may be used.--

Column 10, line 30, cancel the text beginning with "4. A method according to claim 2" to and ending "band mechanism" and insert the following claim:

--4. A method according to claim 3 wherein:
for each packet, the hierarchy information includes a component identifier associated with each level in the hierarchy below the level of the LSP label of the packet;

the component associated with one level below the level of the LSP label of the packet, when present, allowing an identification of a particular possible next lowest level LSP/FA-LSP inside which the LSP/FA-LSP defined by the LSP label is to be used in routing/switching the packet;

the components associated with subsequent lower levels allowing an identification of a particular nested hierarchy of LSP/FA-LSPs to be used for the packet.--

Column 10, line 34, cancel the text beginning with "5. A method according to claim 1" to and ending "may be used" and insert the following claim:

--5. A method according to claim 2 wherein the information maintained in association with every defined LSP/FA-LSP further comprises in the event there is a restoration path for the defined LSP/FA-LSP, source node, transit node, destination node identifiers for the restoration path.--

UNITED STATES PATENT AND TRADEMARK OFFICE
CERTIFICATE OF CORRECTION

| | | |
|---|---|---|
| PATENT NO. | : 6,982,977 B2 | |
| APPLICATION NO. | : 09/981887 | |
| DATED | : January 3, 2006 | |
| INVENTOR(S) | : C. V. Marian et al. | |

It is certified that error appears in the above-identified patent and that said Letters Patent is hereby corrected as shown below:

Column 10, line 44, cancel the text beginning with "6. A method according to claim 5" to and ending "for the packet" and insert the following claim:

--6. A method according to claim 2 wherein network information in association with every defined LSP/FA-LSP, node, and updates are distributed using an in band or out band mechanism.--

Column 10, line 59, delete "6" and insert --4--.

Column 19, line 65, delete "8" and insert --4--.

Column 11, line 4, cancel the text beginning with "9. A method according to claim 1" to and ending "IP packets" and insert the following claim:

--9. A method to be executed at a node within a network of interconnected nodes within which a hierarchical plurality of LSP/FA-LSPs has been defined of performing label switching of packets having an LSP label and having a possibly empty components label, the method comprising:

the node maintaining information for each LSP/FA-LSP comprising an LSP label, an identification of a source node, transit nodes if any, and a destination node, and for each LSP/FA-LSP an identification of all possible next lowest level LSP/FA-LSPs which may use the LSP/FA-LSP;

the node obtaining the LSP label, the LSP label defining a current LSP/FA-LSP of packet to be routed;
the node obtaining the components label of the packet;
the node looking up the information for the current LSP/FA-LSP;

in the event the node is a source node of a next higher level FA-LSP of which the current LSP/FA-LSP forms a component, switching the LSP label to contain the label of the next higher level FA-LSP which is used by the current LSP/FA-LSP, and adding to the components label to include in an additional component identifier an identifier of the current LSP/FA-LSP;
in the event the node is the destination node of the current LSP/FA-LSP, determining from the components label and the maintained information another LSP label for a lower level LSP/FA-LSP from component identifier for the lower level removing the

UNITED STATES PATENT AND TRADEMARK OFFICE
CERTIFICATE OF CORRECTION

| | | |
|---|---|---|
| PATENT NO. | : 6,982,977 B2 | Page 3 of 7 |
| APPLICATION NO. | : 09/981887 | |
| DATED | : January 3, 2006 | |
| INVENTOR(S) | : C. V. Marian et al. | |

It is certified that error appears in the above-identified patent and that said Letters Patent is hereby corrected as shown below:

component label, and changing the LSP label to the another LSP label for the lower level hierarchy determined from the components label;
the node re-applying the components label to the packet;
the node re-applying the LSP label to the packet; and
the node changing an output interface such that the packet of forwarded to an appropriate next node.--

Column 11, line 6, cancel the text beginning with "10. A method to be executed at" to and ending "appropriate next mode" and insert the following claim:

--10. A method of performing label switched routing in a network comprising a plurality of nodes, the method comprising:
at each node of the plurality of nodes in the network:
receiving a packet having a previous label switched path (LSP) header from a previous node in the network;
removing the previous LSP header from the packet and adding a new header to the packet containing a full LSP label for a current label switched paths/forwarding adjacency-label switched paths LSP/FA-LSP, and containing components identifiers which allow local identification of hierarchy of LSP/FA-LSPs of which the current LSP/FA-LSP forms a part; and
forwarding the packet having the new header to a next node in the network.--

Column 11, line 43, cancel the text beginning with "11. A method of performing label" to and ending "in the network" and insert the following claim:

--11. A method according to claim 1 adapted to route IP packets.--

Column 11, line 58, cancel the text beginning with "12. A method of interconnected" to and ending "claim 11" and insert the following claim:

--12. A packet routing/switching system comprising:
a network of interconnected nodes through which is defined a hierarchical plurality of label switched paths (LSP)/forwarding adjacency-label switched paths (FA-LSP) from a lowest (least-nested) level in which LSPs are defined between edge nodes of the network to a highest (most-nested) level, each LSP/FA-LSP comprising a respective sequence of nodes comprising at least a source node and a destination node and possibly one or more transit nodes;

UNITED STATES PATENT AND TRADEMARK OFFICE
CERTIFICATE OF CORRECTION

| | |
|---|---|
| PATENT NO. | : 6,982,977 B2 |
| APPLICATION NO. | : 09/981887 |
| DATED | : January 3, 2006 |
| INVENTOR(S) | : C. V. Marian et al. |

It is certified that error appears in the above-identified patent and that said Letters Patent is hereby corrected as shown below:

wherein each edge node is adapted to maintain a mapping between each packet flow entering the network at the edge node and a respective first LSP of the hierarchical plurality of LSP/FA-LSPs defined between the edge node and a destination node in the network for the packet flow;

wherein each edge node is further adapted to add to each packet of a given packet flow switched routing information comprising an LSP label identifying the respective first LSP to which the packet flow is mapped and to send the packet to subsequent nodes(s) in the sequence of nodes defined for the respective first LSP;

wherein each node other than an edge node is adapted to perform label switching by:
i) if the node is a source node of a higher level FA-LSP than the LSP/FA-LSP identified by the LSP label of the packet, changing the LSP label in the label switched routing information to indicate the source node of the higher level FA-LSP, and including in the label switched routing information hierarchy information in respect of all lower level LSP/FA-LSPs in the hierarchy leading up to the higher level FA-LSP and forwarding the packet to the next node in the sequence of nodes defined for the higher level FA-LSP;
ii) if the node is only a transit node, forwarding the packet to the next node in the sequence of nodes defined for the LSP/FA-LSP identified by the LSP label;
iii) if the node is a destination node of a higher level FA-LSP, changing the LSP label in the label switched routing information to indicate the source node of the next lower level LSP/FA-LSP indicated by the hierarchy information, and changing the hierarchy information to include only hierarchy information in respect of LSP/FA-LSPs in the hierarchy leading up to but not including the next lower level LSP/FA-LSP, and forwarding the packet to the next node in the sequence of nodes defined for the next lower level LSP/FA-LSP.--

Column 11, line 61, cancel the text beginning with "13. A packet routing/switching" to and ending "level LSP/FA-LSP" and insert the following claim:

--13. A system according to claim 12 wherein:

for at least one of the LSP/FA-LSPs in the hierarchical plurality of LSP/FA-LSPs, an associated restoration path is defined between the source node and the destination node of each said at least one of the LSP/FA-LSP;
in each packet being routed according to one of said at least one LSP/FA-LSPs an indication is included of whether the packet should be routed on the restoration path associated with the LSP/FA-LSP or not.--

UNITED STATES PATENT AND TRADEMARK OFFICE
CERTIFICATE OF CORRECTION

PATENT NO. : 6,982,977 B2
APPLICATION NO. : 09/981887
DATED : January 3, 2006
INVENTOR(S) : C. V. Marian et al.

It is certified that error appears in the above-identified patent and that said Letters Patent is hereby corrected as shown below:

Column 12, line 44, cancel the text beginning with "14. A system according to claim 13" to and ending "LSP/FA-LSP or not" and insert the following claim:

--14. A system according to claim 12 wherein each node in the network maintains information in association with every defined LSP/FA-LSP, the information comprising for each defined LSP/FA-LSP:
an LSP label used to uniquely identify the LSP/FA-LSP throughout the network;
an identification of the respective sequence of nodes;
an identification of the LSP label for each possible next lowest level LSP/FA-LSP inside the defined LSP/FA-LSP may be used.--

Column 12, line 55, cancel the text beginning with "15. A system according to claim 14" to and ending "restoration path" and insert the following claim:

--15. A system according to claim 14 wherein:
for each packet, the hierarchy information includes a component identifier associated with each level in the hierarchy below the level of the LSP of the packet;
the component identifier associated with one level below the level of LSP label of the packet, when present, allowing an identification of a particular possible next lowest level LSP/FA-LSP inside which the LSP/FA-LSP defined by the LSP label is to be used in routing/switching the packet; the component identifier associated with subsequent lower levels allowing an identification of a particular nested hierarchy of LSP/FA-LSPs to be used for the packet.--

Column 12, line 60, cancel the text beginning with "16. A system according to claim 14" to and ending "band mechanism" and insert the following claim:

--16. A system according to claim 13 wherein the information maintained in association with every defined LSP/FA-LSP further comprises in the event there is restoration path for the defined LSP/FA-LSP, source node, transit node, destination node identifiers for the restoration path.--

Column 12, line 64, cancel the text beginning with "17. A system according to claim 13" to and ending "may be used" and insert the following claim:

UNITED STATES PATENT AND TRADEMARK OFFICE
CERTIFICATE OF CORRECTION

| | | |
|---|---|---|
| PATENT NO. | : 6,982,977 B2 | Page 6 of 7 |
| APPLICATION NO. | : 09/981887 | |
| DATED | : January 3, 2006 | |
| INVENTOR(S) | : C. V. Marian et al. | |

It is certified that error appears in the above-identified patent and that said Letters Patent is hereby corrected as shown below:

--17. A system according to claim 13 wherein the information in association with every defined LSP/FA-LSP and updates to the information are distributed using an in band or out of band mechanism.--

Column 13, line 7, cancel the text beginning with "18. A system according to claim 17" to and ending "for the packet" and insert the following claim:

--18. A system according to claim 15 wherein:
the hierarchy information includes a bit position for each possible component at each level in the hierarchy, with a particular bit position being set (or cleared) to indicate a selected component as the particular possible component.--

Column 13, line 22, cancel the text beginning with "19. A system according to claim 18" to and ending "possible component" and insert the following claim:

--19. A system according to claim 18 wherein:
the hierarchy information includes a bit position for each possible component at each level in hierarchy, with a particular bit position being set (or cleared) to indicate a selected component as the particular possible component.--

Column 13, line 28, cancel the text beginning with "20. A system according to claim 18" to and ending "in the hierarchy" and insert the following claim:

UNITED STATES PATENT AND TRADEMARK OFFICE
CERTIFICATE OF CORRECTION

PATENT NO. : 6,982,977 B2
APPLICATION NO. : 09/981887
DATED : January 3, 2006
INVENTOR(S) : C. V. Marian et al.

It is certified that error appears in the above-identified patent and that said Letters Patent is hereby corrected as shown below:

--20. A network of interconnect nodes wherein label switched routing is performed in accordance with the method described in claim 10.--

Signed and Sealed this

Thirteenth Day of October, 2009

David J. Kappos
*Director of the United States Patent and Trademark Office*